United States Patent
Lee et al.

(10) Patent No.: US 10,572,051 B2
(45) Date of Patent: Feb. 25, 2020

(54) TOUCH SENSOR AND DISPLAY DEVICE INCLUDING THE SAME

(71) Applicant: Samsung Display Co., Ltd., Yongin-si (KR)

(72) Inventors: Hyun Jae Lee, Yongin-si (KR); Kang Won Lee, Yongin-si (KR); In Nam Lee, Yongin-si (KR); Young Sik Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/238,523

(22) Filed: Jan. 3, 2019

(65) Prior Publication Data
US 2019/0278408 A1   Sep. 12, 2019

(30) Foreign Application Priority Data
Mar. 12, 2018  (KR) ......................... 10-2018-0028590

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04111* (2013.01)

(58) Field of Classification Search
None
See application file for complete search history.

(56) References Cited

U.S. PATENT DOCUMENTS

| 7,663,607 | B2 | 2/2010 | Hotelling et al. | |
|---|---|---|---|---|
| 9,276,239 | B2 | 3/2016 | Park et al. | |
| 9,829,735 | B2 | 11/2017 | Park et al. | |
| 2015/0042601 | A1* | 2/2015 | Lee, II | G06F 3/044 345/174 |
| 2016/0041666 | A1* | 2/2016 | Lee | G02F 1/13338 345/174 |
| 2016/0048267 | A1* | 2/2016 | Lee | G06F 3/0418 345/173 |
| 2016/0062504 | A1* | 3/2016 | Hwang | G06F 3/0412 345/174 |
| 2017/0017328 | A1 | 1/2017 | Tsai et al. | |
| 2019/0243486 | A1* | 8/2019 | Zhang | G06F 3/041 |

FOREIGN PATENT DOCUMENTS

| KR | 10-2014-0100853 | 8/2014 |
|---|---|---|
| KR | 10-1455314 | 10/2014 |
| KR | 10-2015-0019130 | 2/2015 |
| KR | 10-2016-0121747 | 10/2016 |

* cited by examiner

*Primary Examiner* — Nicholas J Lee
(74) *Attorney, Agent, or Firm* — H.C. Park & Associates, PLC

(57) ABSTRACT

According to one or more embodiments of the invention, a touch sensor includes: a first substrate; sensor electrodes spaced apart from each other on a first layer on one surface of the first substrate; sensor lines disposed on a second layer different from the first layer; contact portions electrically connecting a sensor electrode of the sensor electrodes to a sensor line of the sensor lines; and branch wires overlapping the sensor electrode and connecting the contact portions corresponding to the sensor electrode to each other.

20 Claims, 13 Drawing Sheets

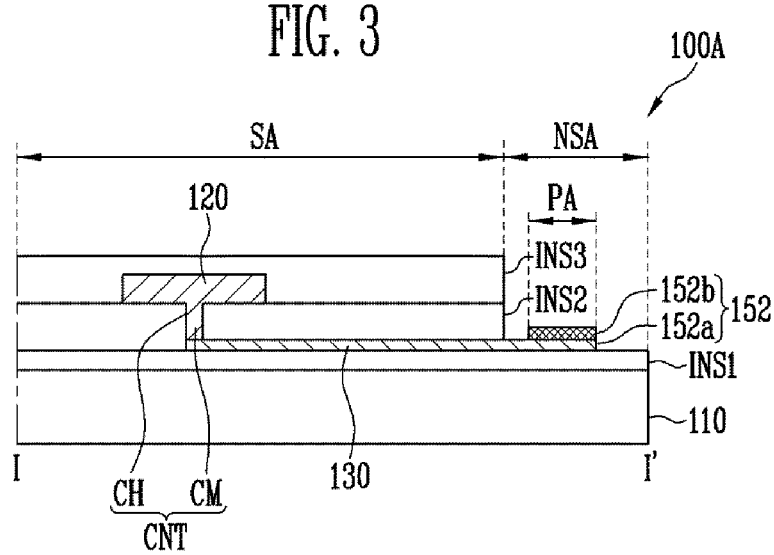
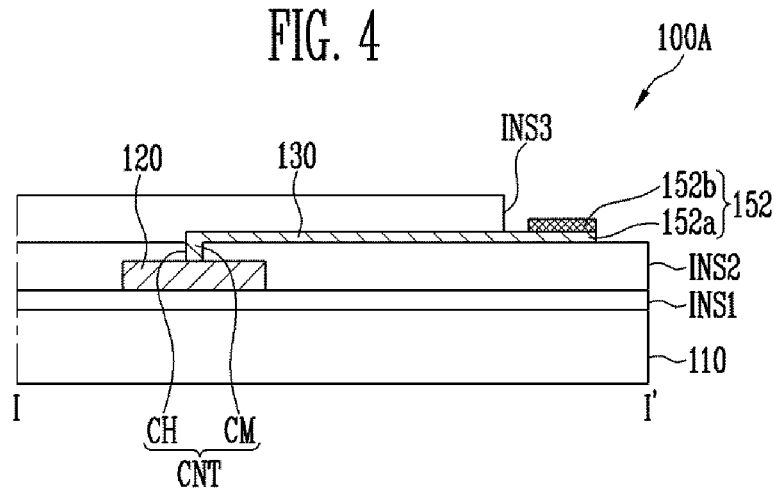
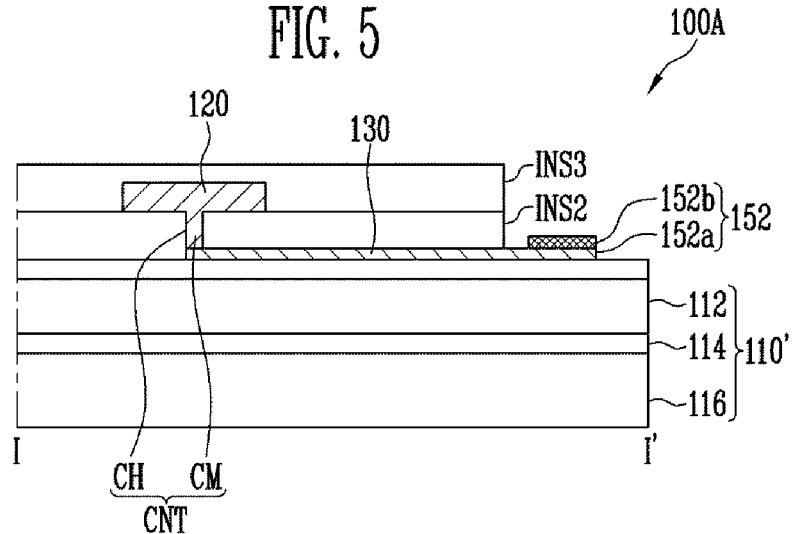

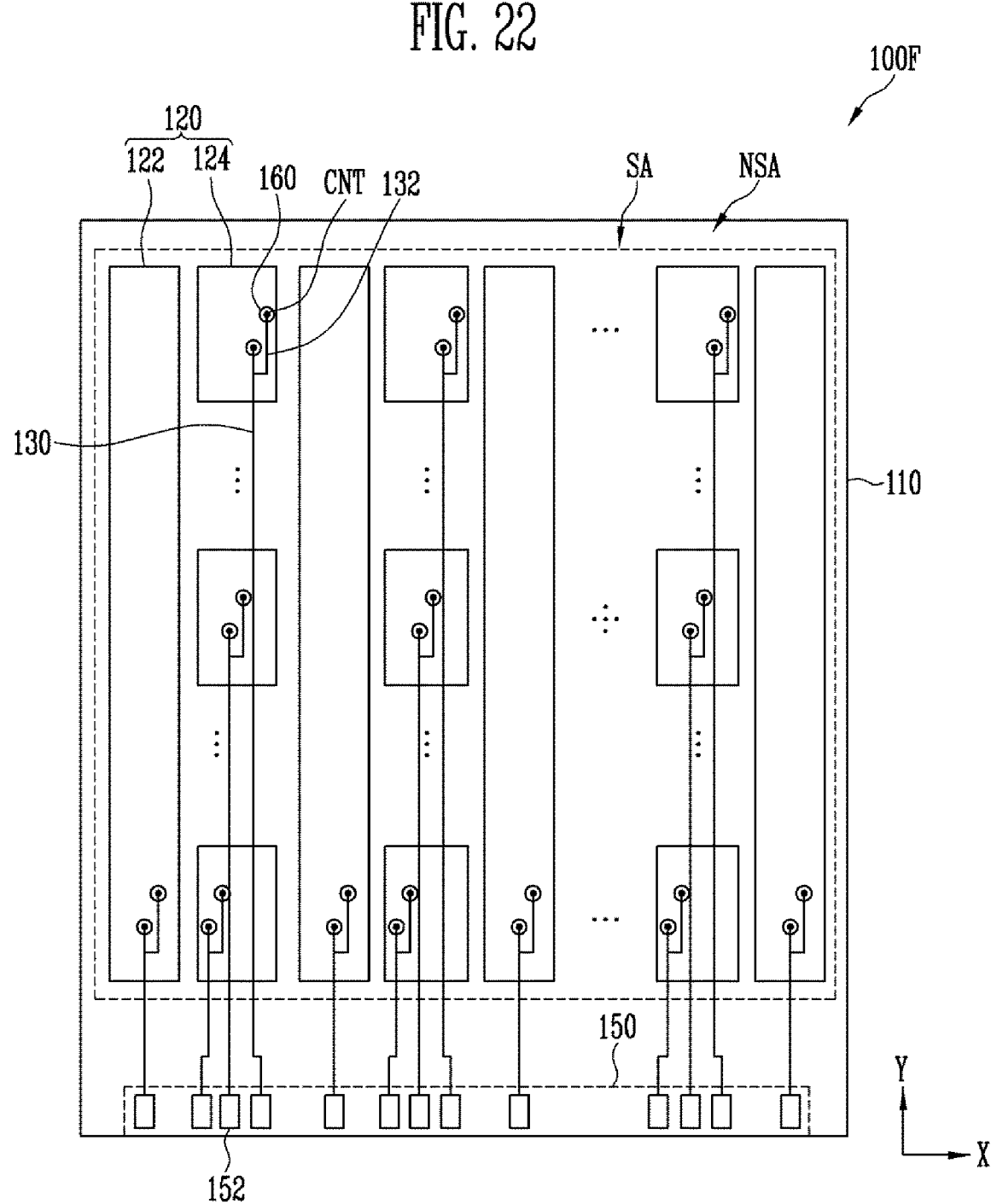

TOUCH SENSOR AND DISPLAY DEVICE INCLUDING THE SAME

CROSS-REFERENCE TO RELATED APPLICATION

This application claims priority from and the benefit of Korean Patent Application No. 10-2018-0028590 filed on Mar. 12, 2018, which is hereby incorporated by reference for all purposes as if fully set forth herein.

BACKGROUND

Field

Exemplary embodiments/implementations of the invention relate generally to a touch sensor and a display device including the same.

Discussion of the Background

Recently, display devices including touch sensors have been generally distributed so as to provide more convenient input means. For example, a touch sensor is attached to a surface of a display panel or is integrally manufactured with a display panel to sense a touch input.

The above information disclosed in this Background section is only for understanding of the background of the inventive concepts, and, therefore, it may contain information that does not constitute prior art.

SUMMARY

Devices constructed according to exemplary embodiments of the invention provide a touch sensor having a uniform visibility characteristic while sensing a touch input with high sensitivity, and a display device including the touch sensor.

Additional features of the inventive concepts will be set forth in the description which follows, and in part will be apparent from the description, or may be learned by practice of the inventive concepts.

According to one or more embodiments of the invention, a touch sensor, including: a first substrate; sensor electrodes spaced apart from each other on a first layer on one surface of the first substrate; sensor lines disposed on a second layer different from the first layer; contact portions electrically connecting a sensor electrode of the sensor electrodes to a sensor line of the sensor lines; and branch wires overlapping the sensor electrode and connecting the contact portions corresponding to the sensor electrode to each other.

The touch sensor may further include: conductive patterns individually disposed on the contact portions, respectively, and electrically connected to the sensor electrode.

The branch wires may be integrally connected to the conductive patterns on the sensor electrode.

Each of the conductive patterns may completely cover an upper surface of each of the contact portions and may have a greater area than each of the contact portions.

The sensor electrodes may be extended or arranged along a first direction and a second direction.

The conductive patterns may be arranged along the first direction or the second direction.

The conductive patterns may be arranged in an oblique direction inclined with respect to the first direction and the second direction.

The conductive patterns may have a first width and a second width in the first direction and the second direction, respectively; and the first width may be equal to the second width.

The branch wires may be integrally connected to the sensor line, respectively.

A region of each of the branch wires may be inclined with respect to an oblique direction in which the sensor electrodes are arranged, or be bent or curved at least at one point.

Each of the branch wires may include a plurality of sub-wiring portions, and each of the sub-wiring portions may connect at least two of the plurality of contact portions with each other or connects one of the plurality of contact portions to a corresponding sensor line.

The touch sensor may further include at least one of: a first insulating layer interposed between the first substrate and the sensor electrodes; and a second insulating layer interposed between the sensor electrodes and the sensor lines.

The sensor lines may be disposed between the first insulating layer and the second insulating layer, and the sensor electrodes may be on top of the second insulating layer.

The sensor electrodes may be disposed between the first insulating layer and the second insulating layer, and the sensor lines may be on top of the second insulating layer.

The touch sensor may further include: a third insulating layer on the sensor electrodes and the sensor lines.

The touch sensor may further include: a second substrate disposed on another surface of the first substrate; and a coupling member disposed between the first substrate and the second substrate.

The sensor electrodes may be arranged in a matrix form along first and second directions.

The sensor electrodes may include: first electrodes arranged along a first direction and each extending along a second direction crossing the first direction; and second electrodes disposed between the first electrodes so as to be spaced apart from the first electrodes, the second electrodes divided into a smaller size than the first electrodes and arranged in plurality along the first and second directions, respectively.

According to one or more embodiments of the invention, a display device includes: pixels disposed in a display area; sensor electrodes spaced apart from each other on a first layer in a sensing area overlapping the display area; sensor lines disposed on a second layer different from the first layer; contact portions electrically connecting a sensor electrode of the sensor electrodes to a sensor line of the sensor lines; and branch wires overlapping the sensor electrode and electrically connecting the contact portions corresponding to the sensor electrode to each other.

The display device may further include: conductive patterns individually disposed on the contact portions, respectively, wherein the conductive patterns may be arranged in an oblique direction inclined with respect to a width direction and a longitudinal direction of the pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 3 illustrates an exemplary embodiment of a cross section taken along a sectional line I-I' of FIG. 2.

FIG. 4 illustrates an exemplary embodiment of a cross section taken along the sectional line I-I' of FIG. 2.

FIG. 5 illustrates an exemplary embodiment of a cross section taken along the sectional line I-I' of FIG. 2.

FIG. 22 illustrates a touch sensor according to an exemplary embodiment.

DETAILED DESCRIPTION

Figure 1:
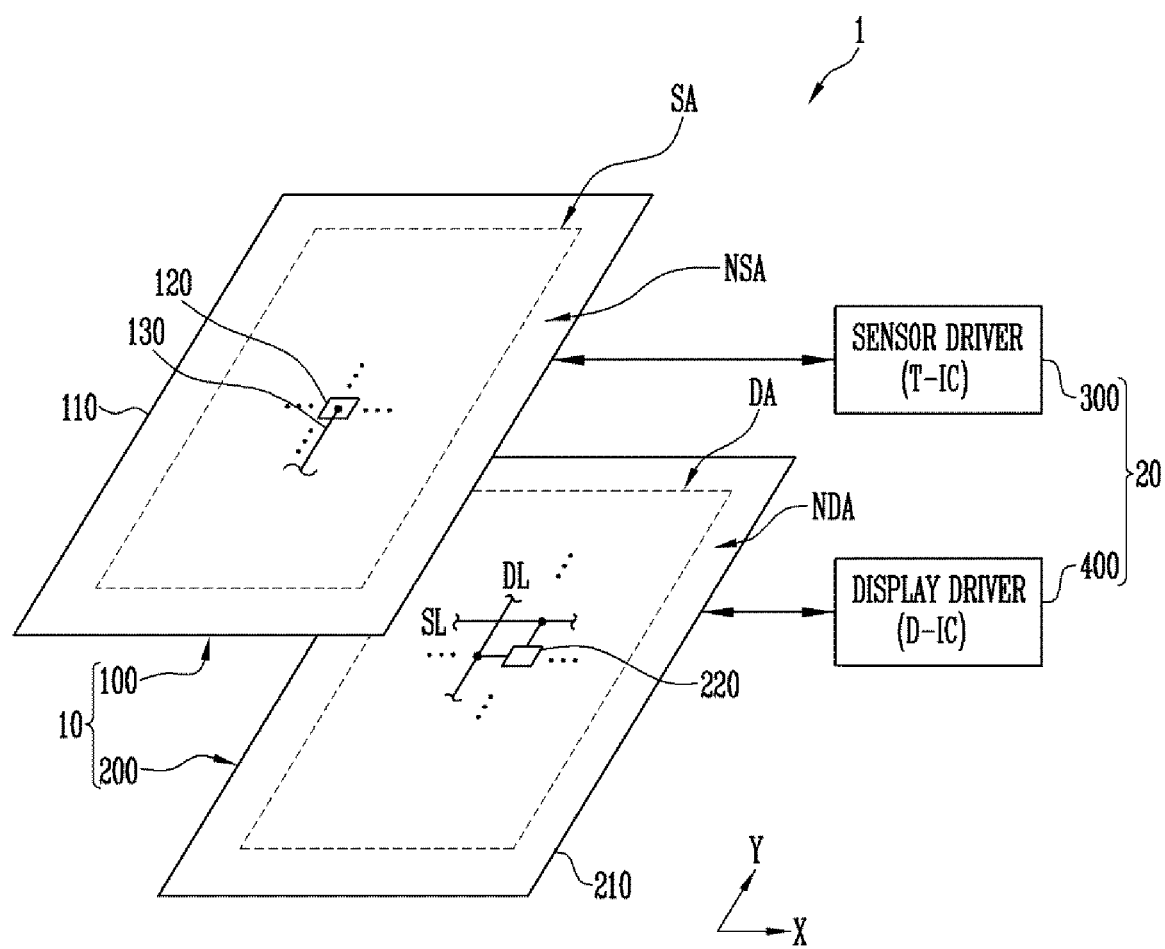
FIG. 1 illustrates a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-direction and the Y-direction are not limited to axes of a rectangular coordinate system, such as the x, y, and z-axes, and may be interpreted in a broader sense. For example, the X-direction, and the Y-direction may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the present disclosure will be described in detail with reference to the accompanying drawings, in order to facilitate a better understanding of the present disclosure by those skilled in the art. However, the embodiments described below are merely illustrative, regardless of whether they are expressed or not. That is, the present disclosure is not limited to the embodiments described below, but may be implemented in various forms. In the following description, when it is assumed that a certain portion is connected to another portion, this includes not only a case where they are directly connected but also a case where they are connected with another device in between.

In the drawings, some of elements not directly related to the features of the present disclosure may be omitted to clearly illustrate the present disclosure. In addition, some of the elements in the drawings may be shown to be exaggerated in size or ratio. In the drawings, the same or similar elements are denoted by the same reference numerals and signs as possible even if they are shown in different drawings.

FIG. 1 illustrates a display device 1 according to an exemplary embodiment. According to an exemplary embodiment, the display device 1 including a self-capacitive touch sensor is shown in FIG. 1, but the kind or type of a touch sensor applied to the present disclosure is not limited thereto.

Referring to FIG. 1, the display device 1 according to the exemplary embodiment includes a panel unit 10 and a driving circuit 20 for driving the panel unit 10. According to an exemplary embodiment, the panel unit 10 includes a sensor unit (e.g., a touch screen or a touch sensing device) 100 for sensing a touch input and a display unit (e.g., a display panel) 200 for displaying an image. The panel unit 10 may also be referred to as "a panel" or "a panel part". The sensor unit 100 may also be referred to as "a sensor panel" or "a sensor part", and the display unit 200 may also be referred to as "a display panel" or "a display part". The driving circuit 20 includes a sensor driver 300 for driving the sensor unit 100 and a display driver 400 for driving the display unit 200. The sensor driver 300 may also be referred to as "a sensor driving circuit" or "a sensor or touch IC (T-IC)", and the display driver 400 may also be referred to as "a display driving circuit" or "a display IC (D-IC)". According to an exemplary embodiment, the sensor unit 100 and the sensor driver 300 may constitute a sensor (also referred to as "a sensing unit", "a sensing device", or "a sensing module", etc.), e.g., a touch sensor, and the display unit 200 and the display driver 400 may constitute a display (also referred to as "a displaying unit", "a displaying device", or "a display module", etc.).

According to an exemplary embodiment, the sensor unit 100 and the display unit 200 may be arranged and/or combined so as to at least partially overlap each other after the sensor unit 100 and the display unit 200 are manufactured separately from each other. For example, the sensor unit 100 may be formed on a separate sensor substrate (or a first substrate) 110, and may then be attached to one surface of the display unit 200 through a lamination method or the like.

According to an exemplary embodiment, the sensor unit 100 and the display unit 200 may be integrally formed or manufactured. For example, the sensor unit 100 may be directly formed on at least one substrate or layer (e.g., an upper substrate and/or a lower substrate or a thin film encapsulation layer (TFE) of a display panel) or another insulating layer or one of various functional layers (e.g., an optical layer such as a polarizing layer or a protective layer).

FIG. 1 illustrates that the sensor unit 100 is disposed at a front surface (e.g., an upper surface on which an image is displayed) of the display unit 200, but the position of the sensor unit 100 is not limited thereto. According to an exemplary embodiment, the sensor unit 100 may be disposed at a back surface or both sides of the display unit 200. According to an exemplary embodiment, the sensor unit 100 may be disposed in at least one edge region of the display unit 200.

The sensor unit 100 includes a sensor substrate 110 and a plurality of sensor electrodes 120 disposed on one surface (e.g., an upper surface) of the sensor substrate 110. Each of the sensor electrodes 120 is connected to at least one sensor line 130.

The sensor substrate 110 may be a substrate for forming various components (e.g., sensor patterns) of the sensor unit 100, and may include at least one substrate member. For example, the sensor substrate 110 may be a single first substrate.

A sensing area SA and a peripheral area NSA may be defined on the sensor substrate 110. The sensing area SA may be an area capable of sensing a touch input, and the peripheral area NSA may be a remaining area other than the sensing area SA and may be set as an outer area surrounding the sensing area SA.

According to an exemplary embodiment, the sensing area SA may be disposed to overlap with at least a part of a display area DA. For example, the sensing area SA may be set as an area (or a region) corresponding to the display area DA (e.g., an area overlapping the display area DA), and the peripheral area NSA may be set as an area corresponding to a non-display area NDA (e.g., an area overlapping the non-display area NDA). In this case, when a touch input is provided in the display area DA, the touch input may be sensed or detected through the sensor unit 100.

The sensor substrate 110 may be a rigid substrate or a flexible substrate and may be configured with at least one insulating layer. Also, the sensor substrate 110 may be a transparent or translucent light transmission substrate, but the present disclosure is not limited thereto. That is, in the present disclosure, the material and property of the sensor substrate 110 are not particularly limited. For example, the sensor substrate 110 may be a rigid substrate configured with glass or tempered glass, or a flexible substrate configured with a thin film made of plastic or metal. Also, According to an exemplary embodiment, at least one substrate (e.g., a display substrate 210, an encapsulation substrate and/or the thin film encapsulation layer) that constitutes the display unit 200, or at least one insulating or functional layer that is disposed inside of the display unit 200 and/or at an outer surface of the display unit 200 may be used as the sensor substrate 110. In addition, the sensor substrate 110 may be a single substrate, or may be multiple substrates in which a plurality of substrates are assembled and/or combined.

The sensing area SA is set as an area capable of reacting with a touch input. That is, the sensing area SA may be an active area of the touch sensor. To this end, the sensor electrodes 120 for sensing a touch input may be disposed in the sensing area SA.

According to an exemplary embodiment, the sensor electrodes 120 are elements for sensing a change in characteristics of a touch signal (e.g., a touch driving signal and/or a touch sensing signal) caused by a user or an environmental change. The sensor electrodes 120 are disposed in the sensing area SA on the sensor substrate 110. For example, the sensor electrodes 120 may be individually and/or separately formed and/or disposed to be spaced apart from each other on a same layer on the sensor substrate 110.

According to an exemplary embodiment, the sensor electrodes 120 may be uniformly distributed (or dispersed) in the sensing area SA. According to an exemplary embodiment, the sensor electrodes 120 may be irregularly or non-uniformly distributed in the sensing area SA, or may be distributed with different densities and/or sizes for each section of the sensing area SA.

For example, when the touch sensor is a dot-type self-capacitive touch sensor, the sensor electrodes 120 may be uniformly distributed at respective coordinates along the first direction (e.g., X-direction) and the second direction (e.g., Y-direction). However, the size, shape, arrangement and/or distribution form of the sensor electrodes 120 are not particularly limited, and may be changed into various forms currently known.

According to an exemplary embodiment, each of the sensor electrodes 120 may have conductivity by including at least one of a metallic material, a transparent conductive material, and various other conductive materials. For example, the sensor electrodes 120 may include at least one of various metallic materials including gold (Au), silver (Ag), aluminum (Al), molybdenum (Mo), chromium (Cr), titanium (Ti), nickel (Ni), neodymium (Nd), copper (Cu), platinum (Pt), and the like, or any alloy thereof. Also, the sensor electrodes 120 may include at least one of various transparent conductive materials including silver nano wire (AgNW), indium tin oxide (ITO), indium zinc oxide (IZO), antimony zinc oxide (AZO), indium tin zinc oxide (ITZO), zinc oxide (ZnO), tin oxide ($SiO_2$), carbon nano tube, graphene, and the like. In addition, the sensor electrodes 120 may include at least one of various other conductive materials, thereby having conductivity. According to an exemplary embodiment, the sensor electrodes 120 may be formed through a process such as deposition and/or etching using a predetermined electrode material (i.e., a conductive material).

Also, the sensor electrodes 120 may be formed of a single layer or a multilayer, and the cross-sectional structure thereof is not particularly limited. For example, each of the sensor electrodes 120 may be formed of one or more transparent or translucent plate-shaped or mesh-shaped electrode layers having a predetermined transmittance range. Each of the sensor electrodes 120 may have a multilayer structure in which the plate-shaped electrode layer and the mesh-shaped electrode layer are stacked. In addition, each of the sensor electrodes 120 may be formed of a semi-transparent conductive material having a predetermined transmittance range, or may be formed of a conductive layer having a predetermined transmittance range by forming an opaque conductive material into a thin film. According to an exemplary embodiment, each of the sensor electrodes 120 may be opaque, or may have an opaque conductive layer with mesh-shaped openings therein.

Each of the sensor electrodes 120 is physically and/or electrically connected to at least one sensor line 130. More specifically, each sensor line 130 between a corresponding sensor electrode 120 and a corresponding pad 152 electrically connects the sensor electrode 120 and the pad 152.

According to an exemplary embodiment, each of the sensor lines 130 may have conductivity by including at least one of a metallic material, a transparent conductive material, and various other conductive materials. Also, each of the sensor lines 130 may be formed of a semi-transparent conductive material having a predetermined transmittance range, or may be formed of a conductive layer having a predetermined transmittance range by forming an opaque conductive material into a thin film. According to an exemplary embodiment, each of the sensor lines 130 may be opaque, or may have an opaque conductive layer and mesh-shaped openings formed in the opaque conductive layer. According to an exemplary embodiment, the sensor lines 130 may be formed through a process such as deposition and/or etching using a predetermined electrode material (i.e., a conductive material).

The sensor lines 130 may be disposed on a different layer from the sensor electrodes 120 with at least one insulating layer interposed therebetween. A pair of the sensor electrode 120 and the sensor line 130 corresponding to each other may be electrically connected to each other through at least one contact hole formed in the insulating layer. Accordingly, in the exemplary embodiment, the size of the peripheral area NSA may be minimized or reduced. Furthermore, even in the sensing area SA, a dead zone due to the sensor lines 130 may be minimized or reduced, and the sensor electrodes 120 may be arranged in greater density. A detailed description of the structure of the sensor unit 100 will be described later.

The display unit 200 includes a display substrate 210 and a plurality of pixels 220 disposed on the display substrate 210. The pixels 220 may be distributed in the display area DA on the display substrate 210.

The display substrate 210 includes the display area DA in which an image is displayed and the non-display area NDA disposed in the periphery of the display area DA. According to an exemplary embodiment, the display area DA may be disposed in a central area of the display unit 200 and the non-display area NDA may be disposed in an edge area of the display unit 200 so as to surround the display area DA. However, the positions of the display area DA and the non-display area NDA are not limited thereto.

The display substrate 210 may be a rigid substrate or a flexible substrate, and the material or property of the display substrate 210 is not particularly limited. For example, the display substrate 210 may be a rigid substrate configured with glass or tempered glass, or a flexible substrate configured with a thin film made of plastic or metal. Also, the display substrate 210 may be configured with at least one other insulating layer.

Scan lines SL, data lines DL, and the pixels 220 coupled to the scan lines SL and the data lines DL are disposed in the display area DA. According to an exemplary embodiment, the pixels 220 may be uniformly distributed in the display area DA. According to an exemplary embodiment, the pixels 220 may be distributed with different densities and/or sizes for each section of the display area DA.

For example, the pixels 220 may be uniformly distributed in the display area DA in a matrix form along the first direction (e.g., X-direction) and the second direction (e.g., Y-direction). The pixels 220 may be distributed in various arrangements such as a stripe or pen-tile shape, and the like in the display area DA. That is, the size, shape, arrangement and/or distribution form of the pixels 220 are not particularly limited.

The pixels 220 are selected by a scan signal supplied from the scan lines SL to be supplied with a data signal from the data lines DL, and emit light with a luminance corresponding to the data signal. Accordingly, an image corresponding to the data signal is displayed in the display area DA. In the present disclosure, the structure and driving method of the pixels 220 are not particularly limited. For example, each of the pixels 220 may have various structures and/or driving methods which are currently known in the art. As an example, the pixels 220 may be self-luminescent type pixels each including at least one organic light emitting diode OLED. According to an exemplary embodiment, the pixels 220 may be non-luminescent type pixels that control the emission or transmission amount of light incident from an external light source using a liquid crystal layer or the like.

Various lines (also referred to as "wires") and/or an internal circuit connected or coupled to the pixels 220 of the display area DA may be disposed in the non-display area NDA. For example, a plurality of lines for supplying various driving powers and driving signals to the display area DA may be disposed in the non-display area NDA. Also, a scan driving circuit (i.e., a scan driver) and the like may be further disposed in the non-display area NDA.

According to the exemplary embodiments of the present disclosure, the kind or type of the display unit 200 is not particularly limited. For example, the display unit 200 may be a self-luminescent type display panel such as an organic light emitting display (OLED) panel or the like. According to the exemplary embodiments, the display unit 200 may be a non-luminescent type display panel such as a liquid crystal display (LCD) panel or the like. When the display unit 200 is the non-luminescent type display panel, the display device 1 may additionally include a light source such as a backlight unit (BLU).

The driving circuit 20 includes the sensor driver 300 for driving the sensor unit 100 and the display driver 400 for driving the display unit 200. According to an exemplary embodiment, the sensor driver 300 and the display driver 400 may be configured separately from each other, or at least portions of the sensor driver 300 and the display driver 400 may be integrated together in one driver IC.

The sensor driver 300 is electrically coupled to the sensor unit 100 to drive the sensor unit 100. For example, the sensor driver 300 may supply a driving signal (or a pre-charge voltage) to the sensor electrodes 120 during a first period of a touch activation period (e.g., a touch sensing period) in which the touch sensor is activated. In addition, the sensor driver 300 may sense or detect respective voltages of the sensor electrodes 120 during a second period of the touch activation period to detect a touch input. According to an exemplary embodiment, the touch sensor may be a mutual-capacitive touch sensor, and the sensor electrodes 120 may be divided into driving electrodes and sensing electrodes. In this case, the sensor driver 300 may receive sensing signals corresponding to driving signals from the sensing electrodes while supplying the driving signals to the driving electrodes to detect a touch input.

The display driver 400 is electrically coupled to the display unit 200 to drive the pixels 220. To this end, the display driver 400 may include a scan driver for supplying a scan signal to the scan lines SL, a data driver for supplying a data signal to the data lines DL, and a timing controller for controlling the scan driver and the data driver. According to an exemplary embodiment, the scan driver, the data driver, and/or the timing controller may be integrated in one display IC (D-IC), but the present disclosure is not limited thereto. For example, according to an exemplary embodiment, the scan driver, the data driver, and/or the timing controller may be embedded in the display unit 200.

The display device 1 described above includes the touch sensor including the sensor unit 100 and the sensor driver 300. Accordingly, the display device 1 may be used more conveniently. For example, a user may easily control the display device 1 by touching a screen while viewing an image displayed in the display area DA.

Figure 2:
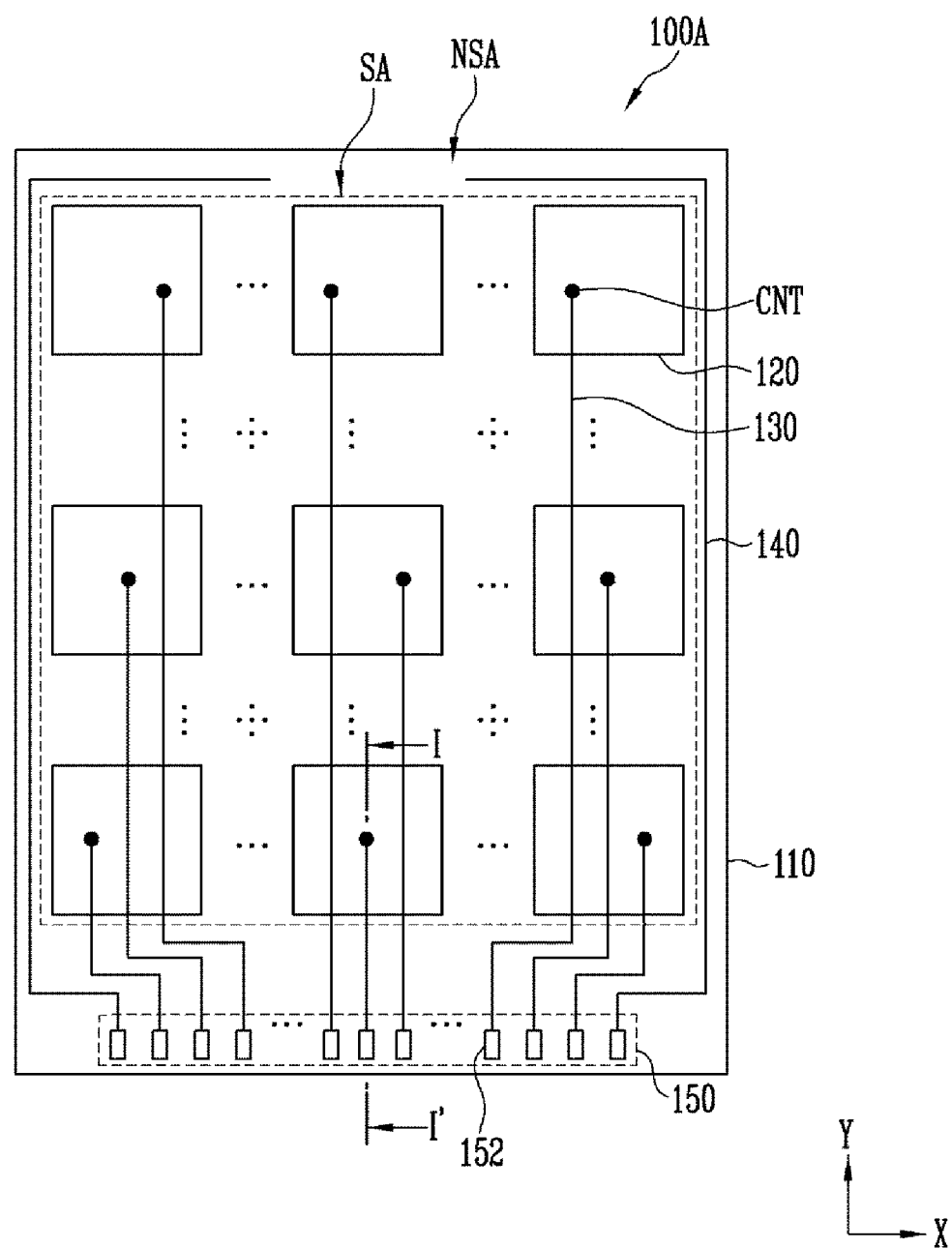
FIG. 2 illustrates a touch sensor according to an exemplary embodiment.

FIG. 2 illustrates a touch sensor according to an exemplary embodiment. Specifically, FIG. 2 shows an exemplary embodiment of a sensor unit 100A of the touch sensor. The touch sensor according to the exemplary embodiment of FIG. 2 may be embedded or constructed inside various electronic devices such as the display device 1 of FIG. 1 and the like. In FIG. 2, components similar or identical to those of FIG. 1 are designated by like reference numerals, and a detailed description of similar or identical components and/or configurations of the exemplary embodiment of FIG. 2 to those of the exemplary embodiment of FIG. 1 will be omitted.

Referring to FIG. 2, the sensor unit 100A according to the exemplary embodiment includes the plurality of sensor electrodes 120 disposed on one surface of the sensor substrate 110. According to an exemplary embodiment, the sensor electrodes 120 may have substantially the same size and may be uniformly distributed in the sensing area SA. Here, the term "substantially the same" may not only mean "completely the same" but also comprehensively mean that "similar within an allowable error or tolerance range."

For example, the sensor electrodes 120 may have the same size within a predetermined error range (e.g., a tolerance of process margin) and may be arranged in a matrix form along the first direction (e.g., X-direction) and the second direction (e.g., Y-direction). For example, the sensor electrodes 120 may be arranged at respective coordinates defined in the sensing area SA of the sensor substrate 110, and a plurality of respective sensor electrodes 120 may be arranged at a uniform interval (e.g., a predetermined interval each for horizontal and vertical directions) on each of the horizontal and vertical lines of the sensing area SA. In addition, according to an exemplary embodiment, the sensor electrodes 120 may be formed and/or disposed on a same layer to be spaced apart from each other.

Each sensor electrode 120 is connected to at least one sensor line 130 and is electrically connected to at least one pad 152 through the sensor line 130. According to an exemplary embodiment, each of the sensor electrodes 120 may be disposed on a different layer from a corresponding sensor line 130 and may be physically and/or electrically connected to the corresponding sensor line 130 through at least one contact portion CNT. That is, according to an exemplary embodiment, the sensor electrodes 120 and the sensor lines 130 are disposed on different layers from each other and are connected to each other through respective contact portions CNT.

A pad unit 150 is disposed in a region of the sensor unit 100A, for example, the peripheral area NSA at a lower end of the sensor unit 100A. Meanwhile, according to an exemplary embodiment, a shield line (or a ground line) 140 and the like may be additionally disposed in at least one region of the peripheral area NSA. For example, the shield line 140 and the like may be disposed so as to surround the outer periphery of the sensing area SA. However, the additional line may be selectively provided in the sensor unit 100A and may be omitted depending on an exemplary embodiment.

The pad unit 150 includes a plurality of pads 152 connected to the respective sensor lines 130 or the shield line 140. The sensor unit 100A may be electrically connected to the sensor driver 300 through the pad unit 150.

Each pad 152 may have conductivity by including at least one of various conductive materials including a metallic material. For example, each of the pads 152 may be made of one or more transparent, semi-transparent or opaque electrode materials (i.e., conductive materials). According to an exemplary embodiment, the pads 152 may be formed through a process such as deposition and/or etching using a predetermined electrode material (i.e., a conductive material).

According to the above-described embodiment, the layer where the sensor electrodes 120 are disposed and the layer where the sensor lines 130 are disposed are separated. Accordingly, the sensor electrodes 120 and the sensor lines 130 may be disposed to overlap with each other. According to the present embodiment, the dead zone due to the wiring region occupied by the sensor lines 130 may be eliminated or reduced, and the sensor electrodes 120 may be arranged more densely in the sensing area SA.

For example, according to the exemplary embodiment, the sensor electrodes 120 may be disposed regardless of the area occupied by the sensor lines 130. Accordingly, the sensor electrodes 120 may be formed in a uniform size throughout the entire sensing area SA. For example, even in a lower end region (e.g., a last horizontal line of the sensing area SA) where a relatively large number of sensor lines 130 are disposed or go through, it is possible to form the sensor electrodes 120 with substantially the same size as an upper end region (e.g., a first horizontal line of the sensing area SA) where a relatively small number of sensor lines 130 are disposed or go through. Furthermore, the distance between adjacent sensor electrodes 120 may be reduced since the sensor electrodes 120 may be disposed at an interval enough to ensure the electrical stability between the adjacent senor electrodes regardless of the area occupied by the sensor lines 130. Accordingly, it is possible to reduce the minimum touch area required for touch detection and to detect even a finer touch input. In addition, the touch input may be detected with uniform and high sensitivity in the entire sensing area SA.

That is, according to the above-described embodiment, the ratio of the area where the sensor electrodes 120 are actually disposed in the sensor unit 100A may be increased and the interval between the adjacent sensor electrodes 120 may be reduced or narrowed. Furthermore, the sensor electrodes 120 may be formed with a uniform size (e.g., uniform shape and area). Accordingly, uniform sensitivity and visibility characteristics may be ensured throughout the sensing area SA, and higher touch sensitivity may be obtained.

In addition, according to the above-described embodiment, it is possible to prevent or reduce a dead zone where it is difficult to detect a touch input from occurring due to the region where the sensor lines 130 are disposed in a comparative embodiment in which the sensor lines 130 are disposed between respective adjacent sensor electrodes 120. Accordingly, in the exemplary embodiment, the limitation or restriction on the area occupied by the sensor lines 130 is relaxed, and a width of each of the sensor lines 130 may be greater that of the comparative embodiment. Assuming, for example, that the width of each of the sensor electrodes 120 is about 4 mm and that 38 sensor electrodes 120 are disposed in each column, in the comparative embodiment, L/S (line/space, which is the sum of the width of each sensor line 130 and the distance between adjacent sensor lines 130) may be set to about 30 μm or less. According to the exemplary embodiment, the L/S of the sensor lines 130 may be extended, for example, to about 100 μm, as the dead zone due to the sensor lines 130 may be substantially removed or reduced. Accordingly, RC delay generated in the sensing lines 130 may be reduced. In this case, a driving frequency band (or driving frequency zone) may be extended as the limitation or restriction on the driving frequency band is relaxed. Accordingly, by reducing the electro-magnetic interference (EMI) and securing the electro-magnetic compatibility (EMC), the influence of noise may be minimized or reduced and the touch sensitivity may be higher.

For similar reasons, in the exemplary embodiment, the limitation or restriction on the size and/or number of sensor electrodes 120 may be relaxed. Accordingly, the selection range may be widened or diversified in a design process of the sensor unit 100A. Assuming, for example, that the width of each of the sensor electrodes 120 is about 4 mm and the L/S of the sensor lines 130 is about 30 μm, each column of the sensor unit 100A may include 133 sensor electrodes 120 and/or sensor lines 130 at a maximum.

Furthermore, according to the above-described embodiment, the sensor lines 130 may be directly routed to one end (e.g., the lower end) of the peripheral area NSA where the pad unit 150 is disposed, instead of routing the sensor lines 130 to pass the peripheral area NSA on both sides (e.g., left and right sides) of the sensing area SA. Accordingly, the width of the peripheral area NSA on both sides of the sensing area SA, for example, the width of left and right bezel areas may be minimized or reduced, and the sensing area SA may be expanded. Thereby, a screen enlarging effect may be obtained.

FIGS. 3 and 4 respectively illustrate exemplary embodiments of a cross section taken along a sectional line I-I' of FIG. 2. For example, FIGS. 3 and 4 illustrate different exemplary embodiments of layered positions of the sensor electrodes 120 and the sensor lines 130 of FIG. 2. In the description of the exemplary embodiments of FIGS. 3 and 4, a detailed description of the components described in FIG. 2 will be omitted.

Referring to FIGS. 2 and 3, the sensor electrodes 120 may be disposed on the sensor lines 130. For example, the sensor unit 100A may include a first insulating layer INS1, the sensor lines 130, a second insulating layer INS2, the sensor electrodes 120 and a third insulating layer INS3 sequentially disposed on one surface of the sensor substrate 110. Also, the sensor unit 100A may include the pads 152 formed on one region of the first insulating layer INS1.

The first insulating layer INS1 may be interposed between the sensor substrate 110 and sensor patterns (e.g., the sensor electrodes 120 and the sensor lines 130). The second insulating layer INS2 may be interposed between the sensor electrodes 120 and the sensor lines 130. The third insulating layer INS3 may be disposed on the sensor patterns.

For example, the sensor lines 130 may be interposed between the first insulating layer INS1 and the second insulating layer INS2, and the sensor electrodes 120 may be disposed on the second insulating layer INS2. Also, the third insulating layer INS3 may be disposed on the sensor electrodes 120 and the sensor lines 130 and may cover the sensor patterns in at least the sensing area SA.

According to an exemplary embodiment, the first insulating layer INS1 may function as a buffer layer, and the second insulating layer INS2 may function as an interlayer insulating layer to prevent the sensor electrodes 120 and the sensor lines 130 from being short-circuited in regions other than the contact portion CNT. The magnitude of the parasitic capacitance formed between the sensor electrodes 120 and the sensor lines 130 may be controlled by controlling the thickness and/or the permittivity (for example, a constituent material) or the like of the second insulating layer INS2. The third insulating layer INS3 may function as a protective layer that protects the sensor patterns from external impacts or impurities and ensures the physical and/or electrical stability of the sensor patterns.

In addition, each of the first, second, and third insulating layers INS1, INS2, and INS3 may have an optical function in addition to an insulating function. For example, the first, second, and third insulating layers INS1, INS2, and INS3 may alleviate the non-uniform visibility characteristics of the sensing area SA that may occur due to the sensor patterns so that the sensing area SA is uniformly viewed in its entirety. For example, a thickness and/or materials of each of the first, second, and third insulating layers INS1, INS2, and INS3 may be adjusted or determined so as to enhance the cancelling effect of reflected light from the sensor electrodes 120 and reflected light from the sensor lines 130, or to reduce the reflectivity variation between a region where the sensor electrodes 120 are disposed and a region between the sensor electrodes 120 through refractive index matching. Accordingly, it is possible to prevent or reduce pattern-exposure of the sensor patterns (e.g., visualization of the sensor pattern), thereby ensuring a uniform visibility characteristic throughout the sensing area SA.

According to an exemplary embodiment, each of the first, second, and third insulating layers INS1, INS2, and INS3 may include at least one insulating material and may be formed of a single layer or a multilayer. For example, each of the first, second, and third insulating layers INS1, INS2, and INS3 may include at least one of silicon oxide ($SiO_2$), titanium oxide ($TiO_2$), lithium fluoride (La) calcium fluoride ($CaF_2$), magnesium fluoride ($MaF_2$), silicon nitride ($SiN_x$), tantalum oxide ($Ta_2O_5$), niobium oxide ($Nb_2O_5$), silicon carbon nitride (SiCN), molybdenum oxide ($MoO_x$), iron oxide ($FeO_x$), and chromium oxide ($CrO_x$) and may also be made of one or more other insulating materials.

Each of the first, second, and third insulating layers INS1, INS2, and INS3 may be formed through various insulating layer forming processes currently known. For example, each of the first, second, and third insulating layers INS1, INS2, and INS3 may be formed by a lamination process using a soft or flexible material such as a lamination film or a spin coating or slit die coating process using a solution type insulating material.

According to an exemplary embodiment, the first insulating layer INS1 may be formed over an entire region on one surface of the sensor substrate 110, and the second and third insulating layers INS2, and INS3 may be formed in a partial region on the surface of the sensor substrate 110, For example, the second and third insulating layers INS2, and INS3 may cover the sensor patterns in the sensing area SA and may be removed from at least one region of the peripheral area NSA, particularly the pad area PA, so as to expose the pads 152.

According to an embodiment, at least one of the first, second, and third insulating layers INS1, INS2, and INS3 may not be provided. For example, the first and/or third insulating layers INS1 and/or INS3 may be omitted.

According to an exemplary embodiment, the sensor lines 130 may extend from the sensing area SA to the pad area PA. For example, one end 152a of each of the sensor lines 130 extending into the pad area PA may constitute a multilayered pad 152 along with at least one conductive layer 152b disposed on top or bottom of the end 152a. According to an exemplary embodiment, each of the pads 152 may be a single conductive layer connected integrally or non-integrally with a corresponding sensor line 130. Also, each of the pads 152 may be formed to have various structures and/or shapes that are currently known.

Meanwhile, in the exemplary embodiment, each sensor electrode 120 and the corresponding sensor line 130 may be disposed on different layers and are electrically connected to each other through at least one contact portion CNT. According to an exemplary embodiment, each contact portion CNT may include a contact hole CH formed in the second insulating layer INS2, and a conductive member CM embedded in the contact hole CH.

In detail, at least one contact hole CH corresponding to each sensor electrode 120 is formed in the second insulating layer INS2. That is, a plurality of contact holes CH for electrical connection between the sensor electrodes 120 and the sensor lines 130 may be formed in the second insulation layer INS2. According to an exemplary embodiment, the contact holes CH may be formed by an etching process or the like.

The conductive member CM fills each of the contact holes CH. According to an exemplary embodiment, the conductive member CM may be integrally formed with at least one of the sensor patterns in a process of forming the at least one of sensor patterns. For example, the conductive member CM may be integrally formed with each sensor electrode 120 in a process of forming the sensor electrodes 120.

Referring to FIGS. 2 and 4, positions or locations of the sensor electrodes 120 and the sensor lines 130 may vary. For example, the sensor lines 130 may be disposed on the sensor electrodes 120.

For example, the sensor electrodes 120 may be disposed between the first insulating layer INS1 and the second insulating layer INS2, and the sensor lines 130 and the pads 152 may be disposed on the second insulating layer INS2. In addition, the third insulating layer INS3 may be disposed on the sensor patterns including the sensor electrodes 120 and the sensor lines 130.

In the exemplary embodiment of FIG. 4, the conductive member CM may be formed integrally with each of the sensor lines 130 in a process of forming the sensor lines 130. For example, after forming the second insulating layer INS2, and the contact holes CEI penetrating the second insulating layer INS2, each of the contact holes CR may be filled with the conductive member CM which is integrally connected to the corresponding sensor line 130 in the process of forming the sensor lines 130 on the second insulating layer INS2.

When the sensor lines 130 and the pads 152 are disposed on the second insulating layer INS2 as described above, restrictions or limitations on temperatures and the like may be relaxed in the process for forming the sensor lines 130 and the pads 152. For example, a distance to the sensor lines 130 and the pads 152 from the sensor substrate 110 may be sufficiently secured as compared with the exemplary embodiment of FIG. 3. Thereby, in a process of forming a conductive film for forming the sensor lines 130 and/or the pads 152, the deposition temperature may be increased to improve the film forming quality. Accordingly, the physical properties quality) of the sensor lines 130 and/or the pads 152 may be improved.

According to the exemplary embodiments of FIGS. 3 and 4, the layer in which the sensor electrodes 120 are disposed and the layer in which the sensor lines 130 are disposed may be separated, as described in the exemplary embodiment of FIG. 2. Accordingly, uniform sensitivity and visibility characteristics may be ensured throughout the sensing area SA, and higher touch sensitivity may be obtained.

Furthermore, by adjusting or controlling the material and/or thickness of the first, second, and third insulating layers INS1, INS2, and INS3, an optical compensation effect may be obtained in which the sensing area SA is uniformly viewed.

FIG. 5 illustrates an exemplary embodiment of a cross section taken along the sectional line I-I' of FIG. 2. For example, FIG. 5 illustrates another exemplary embodiment of the sensor substrate 110 of FIG. 2. In the description of the exemplary embodiment of FIG. 5, a detailed description of similar or identical components and/or configurations to those of the above-described embodiments will be omitted.

Referring to FIG. 5, a sensor substrate 110' may be a multi-layered substrate including a plurality of substrates assembled and/or combined with each other. For example, the sensor substrate 110' may include a first substrate 112, including a first surface on which the sensor electrodes 120 and the sensor lines 130 are disposed, a second substrate 116 disposed on a second surface of the first substrate 112 opposing the first surface, and a coupling member 114 disposed between the first and second substrates 112 and 116. That is, the first and second substrates 112 and 116 may be assembled and/or combined through the coupling member 114. For example, the first and second substrates 112 and 116 may be combined or bonded to each other through a lamination process.

According to an exemplary embodiment, each of the first and second substrates 112 and 116 may be made of the material referred to as a constituent material of the sensor substrate 110 in the foregoing embodiment, and may be a rigid or flexible substrate. For example, the first and/or second substrate 112 and 116 may be a lamination film. In addition, each of the first and second substrates 112 and 116 may be a transparent or opaque substrate.

According to an exemplary embodiment, at least one of the first and second substrates 112 and 116 may be any one of the substrate members constituting the display panel and/or the touch sensor, or the display panel itself. For example, the first substrate 112 may be a substrate member for forming the sensor patterns including the sensor electrodes 120 and the sensor lines 130. The second substrate 116 may be a separate touch sensor substrate, a display panel, or at least one of various functional layers, for example, a polarizing layer, an optical layer and/or a protective layer provided inside and/or outside the display panel.

The coupling member 114 may be a medium for coupling or bonding the first and second substrates 112 and 116. According to an exemplary embodiment, the coupling member 114 may be formed directly on one surface of the first substrate 112 or may be disposed between the first and second substrates 112 and 116 through a separate lamination process or the like. For example, the coupling member 114 may be a transparent adhesive such as optically clear adhesive (OCA) or optically clear resin (OCR), but is not limited thereto.

That is, the kind or type, structure, position and/or material of the sensor substrate 110, 110' may vary in the present disclosure.

Figure 6:
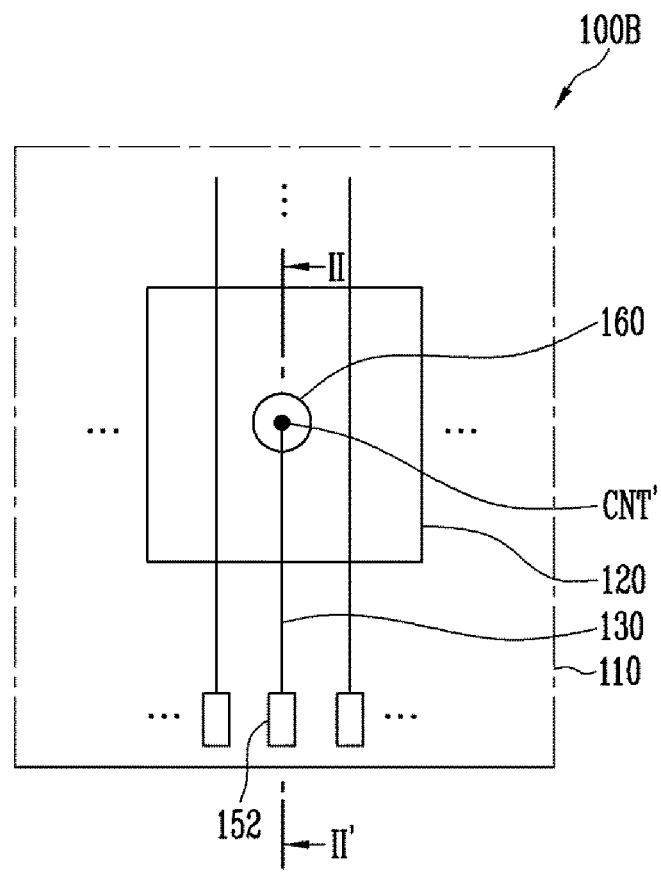
FIG. 6 illustrates a touch sensor according to an exemplary embodiment.
Figure 7:
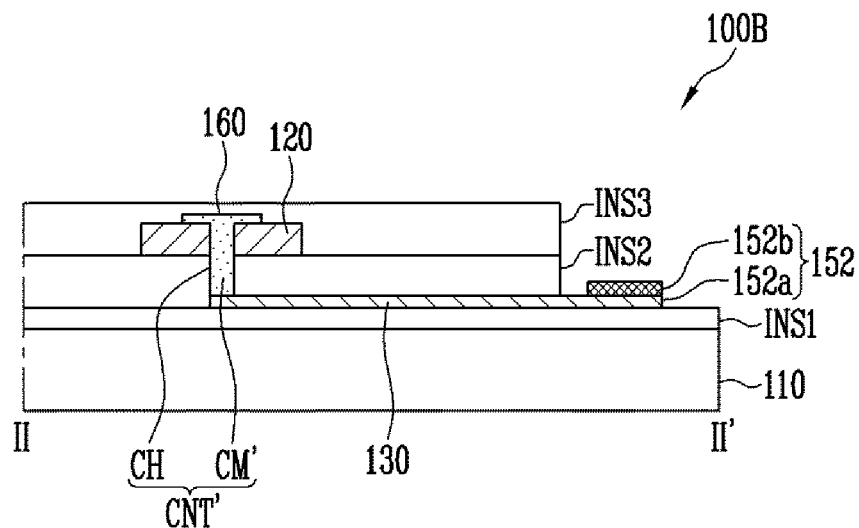
FIG. 7 illustrates an exemplary embodiment of a cross section taken along a sectional line II-II' of FIG. 6.
Figure 8:
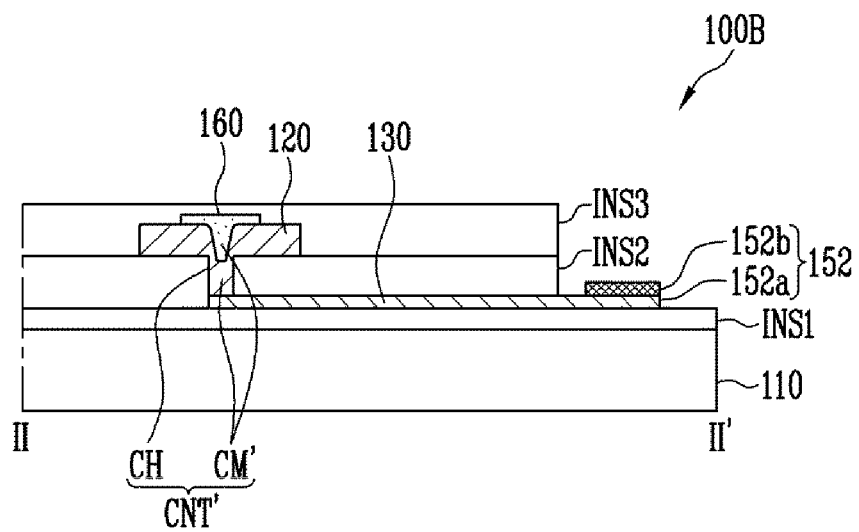
FIG. 8 illustrates an exemplary embodiment of a cross section taken along the sectional line II-II' of FIG. 6.

FIG. 6 illustrates a touch sensor according to an exemplary embodiment. FIGS. 7 and 8 respectively illustrate embodiments of a cross section taken along a sectional line II-II' of FIG. 6. For example, FIGS. 7 and 8 illustrate different embodiments of the cross section taken along the sectional line II-II' of FIG. 6.

For convenience, in FIG. 6 schematically illustrates the structure of a sensor unit 100B with respect to any one of the sensor electrodes 120. The sensor electrodes 120 disposed in the sensor unit 100B may have substantially the same or similar structure. In the description of the exemplary embodiments of FIGS. 6, 7, and 8, a detailed description of similar or identical components and/or configurations to those of the above-described embodiments will be omitted.

Referring to FIGS. 6, 7, and 8, the sensor unit 100B according to the present ro embodiment may further include at least one conductive pattern 160 disposed on each of the sensor electrodes 120. That is, the sensor unit 100B may include a plurality of conductive patterns 160 formed on the plurality of sensor electrodes 120. In addition, one or more conductive patterns 160 may be formed on each sensor electrode 120.

According to an exemplary embodiment, the conductive patterns 160 may be locally disposed on top of each contact portion CNT'. For example, each of the conductive patterns 160 may be an island-type pattern and may be individually disposed on top of the corresponding contact portion CNT'. According to an exemplary embodiment, each conductive pattern 160 may be formed with a predetermined margin to have a larger area than each of the contact portions CNT' so as to completely cover the upper surface of the corresponding contact portion CNT'. In addition, each conductive pattern 160 may have various shapes and/or sizes. For example, each conductive pattern 160 may have a circular or elliptical shape and may be formed to have a size enough to completely cover the corresponding contact portion CNT'.

According to an exemplary embodiment, the conductive patterns 160 may have conductivity by including at least one of a metallic material, a transparent conductive material, and various other conductive materials. In addition, the conductive patterns 160 may be made of the same conductive material as the sensor electrodes 120 and/or the sensor lines 130, or may be made of a conductive material different from the conductive materials. For example, the conductive patterns 160 and the sensor electrodes 120 may be made of the same transparent conductive material. According to an exemplary embodiment, the conductive patterns 160 may be made of an opaque metallic material, and the sensor electrodes 120 may be made of a transparent conductive material.

The conductive patterns 160 may be electrically connected to the respective sensor electrodes 120. For example, as shown in FIG. 7, each conductive pattern 160 may be formed integrally with the conductive member CM' of the corresponding contact portion CNT'. To this end, at least one contact hole CH passing through the second insulating layer INS2, and each of the sensor electrode 120 is formed, and then, the respective conductive patterns 160 and the corresponding conductive members CM' may be integrally formed by filling each of the contact holes in a process of forming the conductive patterns 160.

As shown in FIG. 8, the respective contact holes CH may be primarily filled in the process of forming the sensor electrodes 120, and then inner spaces of the contact holes CH which are not fully filled and/or recesses or grooves of the sensor electrodes 120 may be completely filled or covered in the process of forming the conductive patterns 160. When the sensor lines 130 are disposed on the sensor electrodes 120 as in the exemplary embodiment of FIG. 4, at least part of the contact holes CH may be filled in the process of forming the sensor lines 130.

In this case, each conductive member CM' may include one or more conductive materials. In addition, the conductive member CM' may be formed integrally with a corresponding sensor line 130 and/or a corresponding conductive pattern 160.

According to the above-described embodiments, it is possible to reduce or decrease the resistance of each contact portion CNT' by additionally forming the conductive patterns 160. For example, in the case where the contact resistance is increased by the inside of each contact hole CH not being completely filled or a foreign material being introduced inside the contact hole CH, the contact resistance may be reduced or decreased by additionally forming the conductive patterns 160. Accordingly, the reliability of the sensor unit 100B nay be improved or ensured.

Figure 9:
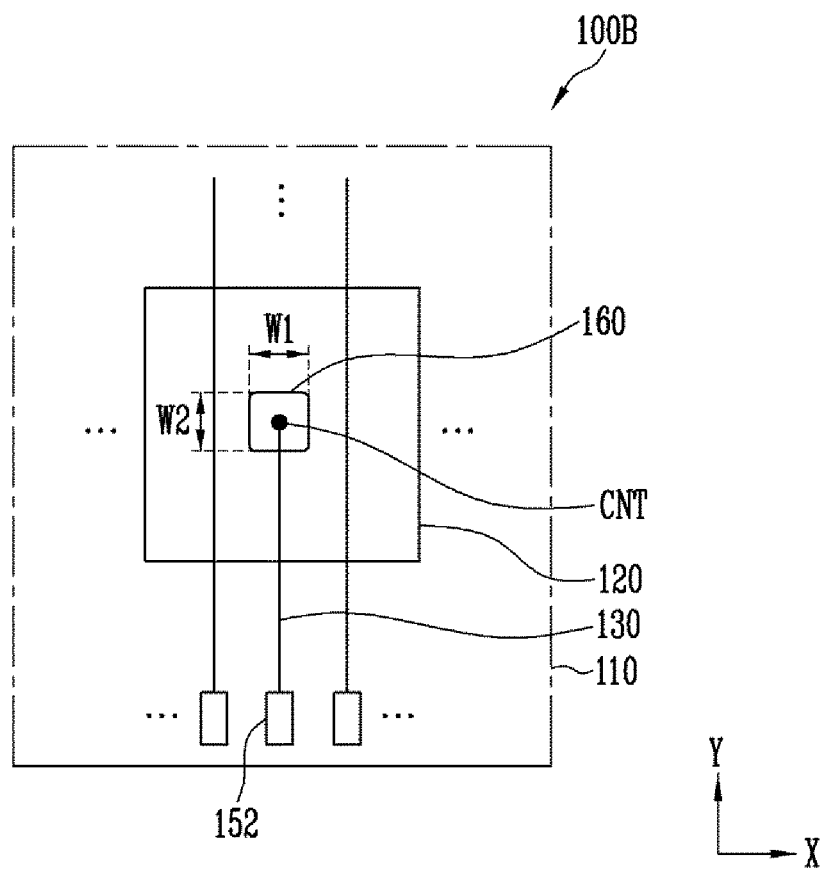
FIGS. 9, 10, and 11 respectively illustrate exemplary embodiments of a conductive pattern shown in FIG. 6.
Figure 10:
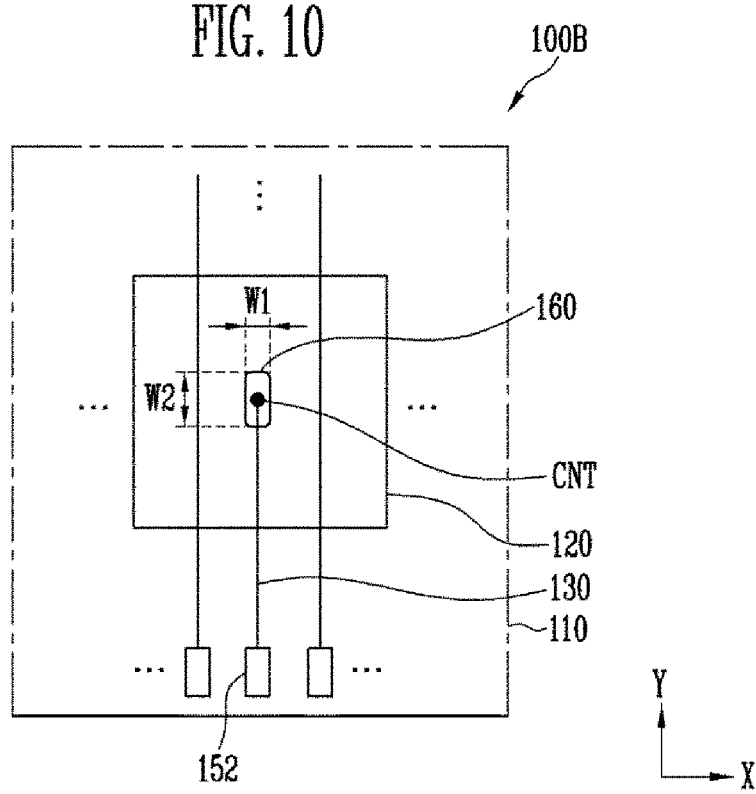
Figure 11:
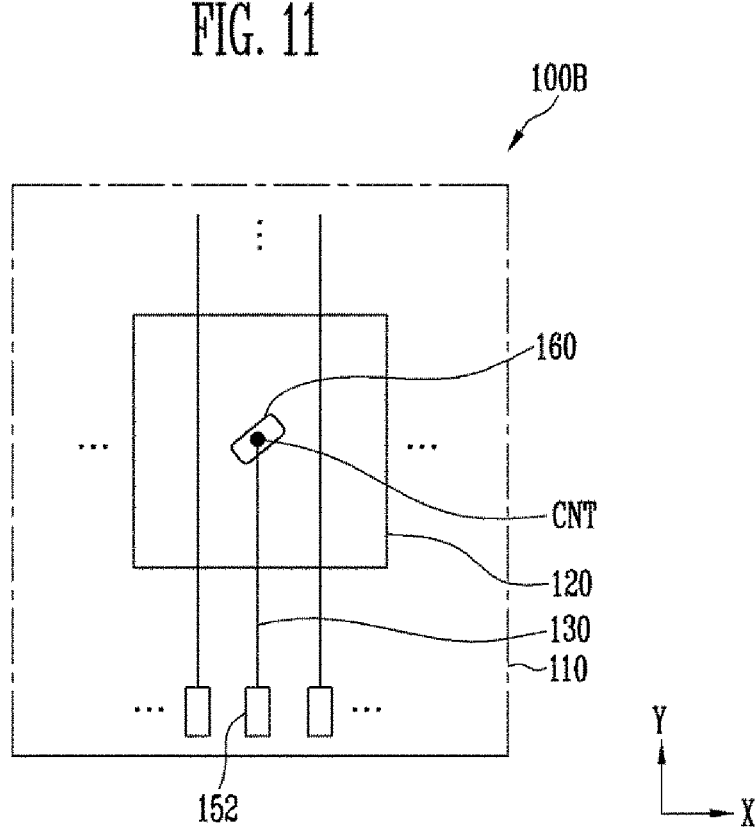
Figure 12:
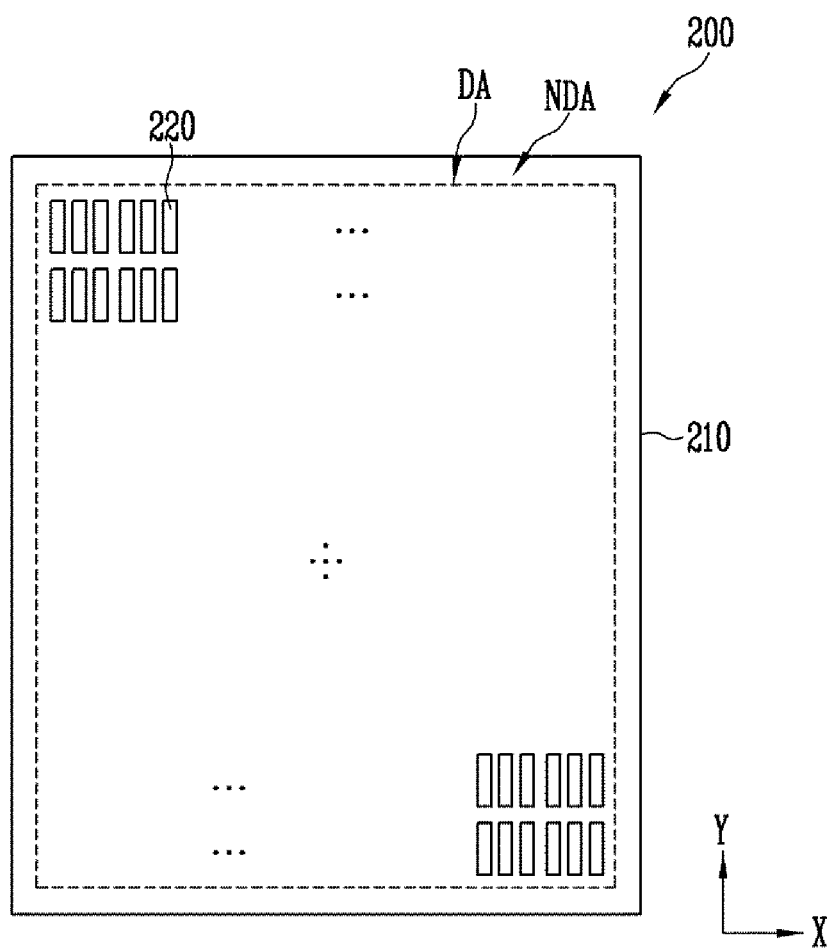
FIG. 12 illustrates a display unit according to an exemplary embodiment.

FIGS. 9, 10, and 11 respectively illustrate exemplary embodiments of the conductive pattern shown in FIG. 6. In the description of the exemplary embodiments of FIGS. 9, 10, and 11, a detailed description of similar or identical components and/or configurations to those of the above-described embodiments will be omitted. In the meantime, FIG. 12 illustrates a display unit according to an exemplary embodiment.

Firstly, referring to FIGS. 9, 10, and 11, the shape, size, and/or arrangement direction of each conductive pattern 160 may be variously changed. For example, as shown in FIG. 9, each of the conductive patterns 160 may have a square structure (or shape) or a modified square structure in which only each corner portion of a square is curved. In this case, the conductive patterns 160 may have the same width in the first and second directions, for example, the X and Y directions in which the sensor electrodes 120 are arranged. For example, the width (hereinafter referred to as a first width) W1 of each of the conductive patterns 160 along the first direction is equal to or substantially the same as the width (hereinafter referred to as a second width) W2 of each of the conductive pattern 160 along the second direction.

According to an exemplary embodiment, each of the conductive patterns 160 may have a rectangular or elliptical structure or the like. For example, as shown in FIG. 10, each of the conductive patterns 160 may have a rectangular structure (or shape) or a modified rectangular structure in which only each corner portion of a rectangle is curved. In this case, each of the conductive patterns 160 may have different widths in the first and second directions, for example, the X and Y directions in which the sensor electrodes 120 are arranged. For example, the first width W1 may be narrower than the second width W2 in respective conductive patterns 160. That is, each of the conductive patterns 160 may be arranged along the first or second direction, and may have a longitudinal direction extending in the first or second direction.

According to an exemplary embodiment, each of the conductive patterns 160 may be inclined with respect to the first and second directions in which the sensor electrodes 120 are arranged. For example, as shown in FIG. 11, each of the conductive patterns 160 may be arranged in an oblique direction inclined with respect to the first and second directions (X and Y directions). When the conductive patterns 160 are formed to be inclined as in the exemplary embodiment of FIG. 11, it is possible to prevent the image quality from deteriorating due to the sensor patterns and/or the pixels 220.

For example, as shown in FIG. 12, when the pixels 220 are arranged regularly on the display unit 200 with a width and a length respectively along the first and second directions, the conductive patterns 160 may be extended and/or arranged in an oblique direction inclined with respect to a width direction and a longitudinal direction (that is, the first and second directions) of the pixels 220. In this case, the sensor patterns including the conductive patterns 160 and/or the pixels 220 may be prevented from being visually recognized. Here, the conductive patterns 160 may have a rectangular shape extending in an oblique direction, and the angle at which the conductive patterns 160 are inclined may be variously changed in consideration of the pixel arrangement structure, process conditions, and the like.

Figure 13:
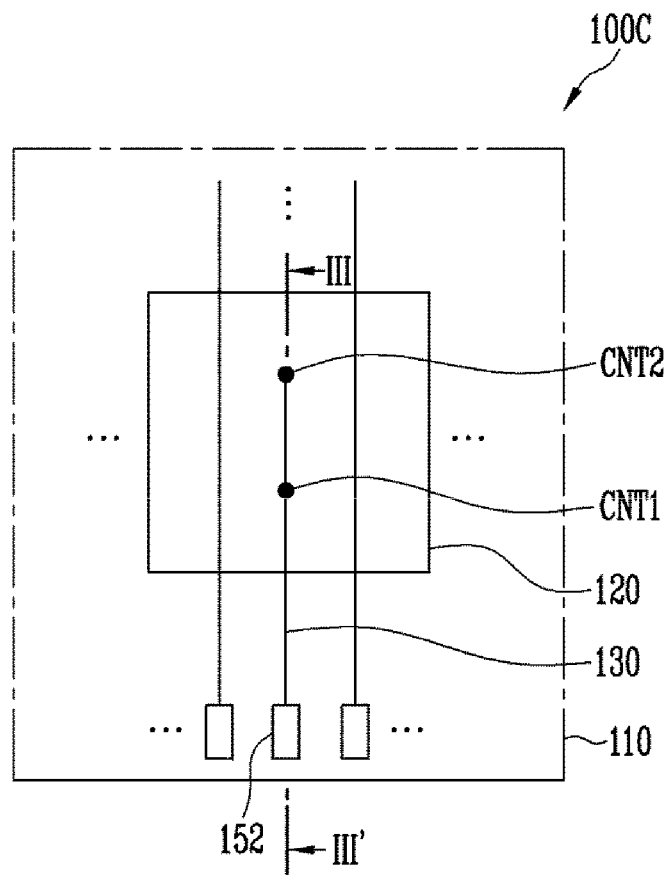
FIG. 13 illustrates a touch sensor according to an exemplary embodiment.
Figure 14:
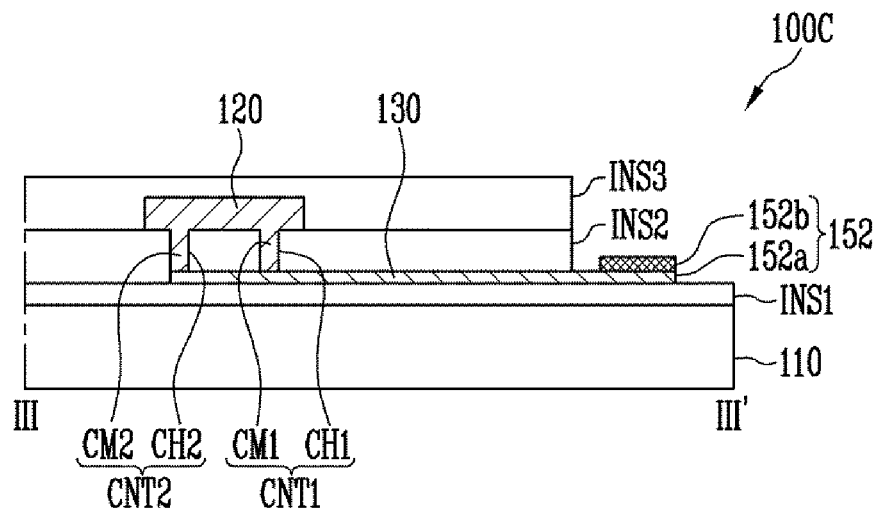
FIG. 14 illustrates an exemplary embodiment of a cross section taken along a sectional line III-III' of FIG. 13.

FIG. 13 illustrates a touch sensor according to an exemplary embodiment. FIG. 14 illustrates an exemplary embodiment of a cross section taken along a sectional line of FIG. 13. In the description of the exemplary embodiments of FIGS. 13 and 14, a detailed description of similar or identical components and/or configurations to those of the above-described embodiments, for example, as the exemplary embodiment of FIGS. 2 and 3, will be omitted.

Referring to FIGS. 13 and 14, each sensor electrode 120 and a corresponding sensor line 130 are electrically connected to each other via a plurality of contact portions (e.g., at least a first contact portion CNT1 and a second contact portion CNT2). That is, in the touch sensor according to the present embodiment, the sensor electrodes 120 and the sensor lines 130 provided in a sensor unit 100C are disposed on different layers, and a pair of the sensor electrode 120 and the sensor line 130 corresponding to each other may be electrically connected to each other through the plurality of contact portions. For example, each of the sensor electrodes 120 may be electrically connected to one of the sensor lines 130 through the first contact portion CNT1 and the second contact portion CNT2.

According to an exemplary embodiment, the first contact portion CNT1 may include a first contact hole CH1 and a first conductive member CM1 embedded in the first contact hole CH1, and the second contact portion CNT2 may include a second contact hole CH2 and a second conductive member CM2 embedded in the second contact hole CH2. According to an exemplary embodiment, the first and second contact portions CNT1 and CNT2 may have substantially the same size, shape, and/or structure, but are not limited thereto.

The first and second contact portions CNT1 and CNT2 may be spaced apart from each other by a predetermined distance in a region where a corresponding sensor electrode 120 is disposed. In addition, according to an exemplary embodiment, the first and second contact portions CNT1 and CNT2 may be arranged in a straight line. For example, the first and second contact portions CNT1 and CNT2 and a corresponding sensor line 130 may be arranged in a straight line in the region where the corresponding sensor electrode 120 is disposed. However, the present invention is not limited thereto, and the arrangement and/or distribution form of the first and second contact portions CNT1 and CNT2 may vary. For example, the arrangement and/or distribution form of the first and second contact portions CNT1 and CNT2 may be changed in various forms depending on embodiments.

According to the above-described embodiment, contact resistance between the corresponding sensor electrode 120 and sensor line 130 may be reduced by electrically connecting the sensor electrode 120 and sensor line 130 through the plurality of contact portions. Further, the structure of the above-described embodiment may be usefully applied to a flexible display device which is bendable or foldable. For example, when one region of the sensor unit 100C is deformed, even in the case where a connection is disconnected in a contact portion (for example, any one of the first and second contact portions CNT1 and CNT2) at or near the region where deformation occurs, it is possible to maintain a connection between the corresponding sensor electrode 120 and sensor line 130 through another contact portion (for example, the other one of the first and second contact portions CNT1 and CNT2). Accordingly, the reliability of the sensor unit 100C may be ensured.

Figure 15:
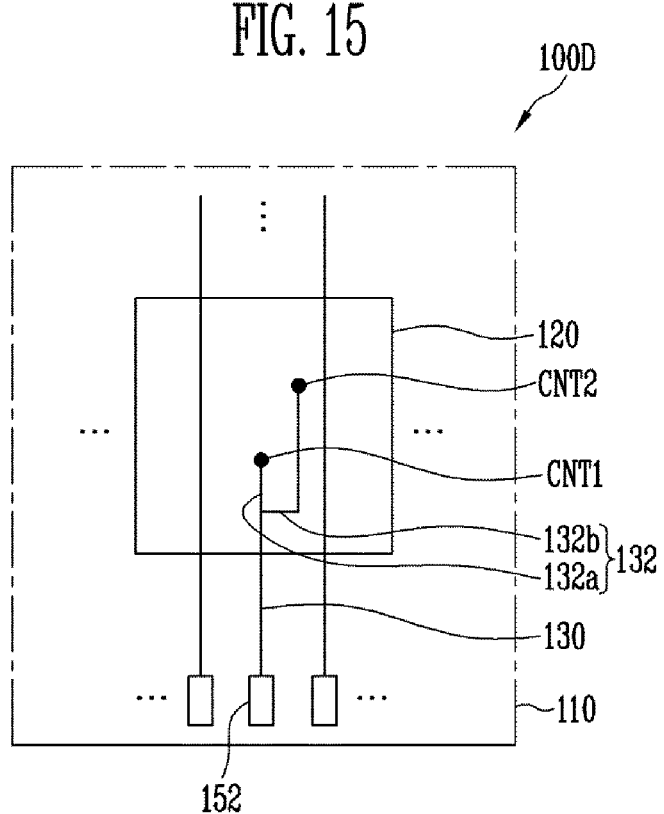
FIGS. 15, 16, and 17 illustrate a touch sensor according to an exemplary embodiment.
Figure 16:
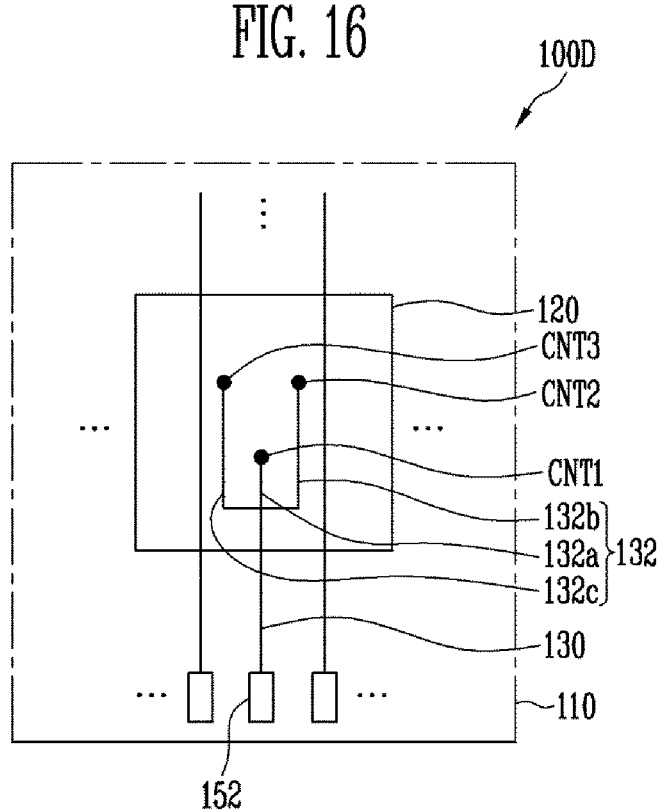
Figure 17:
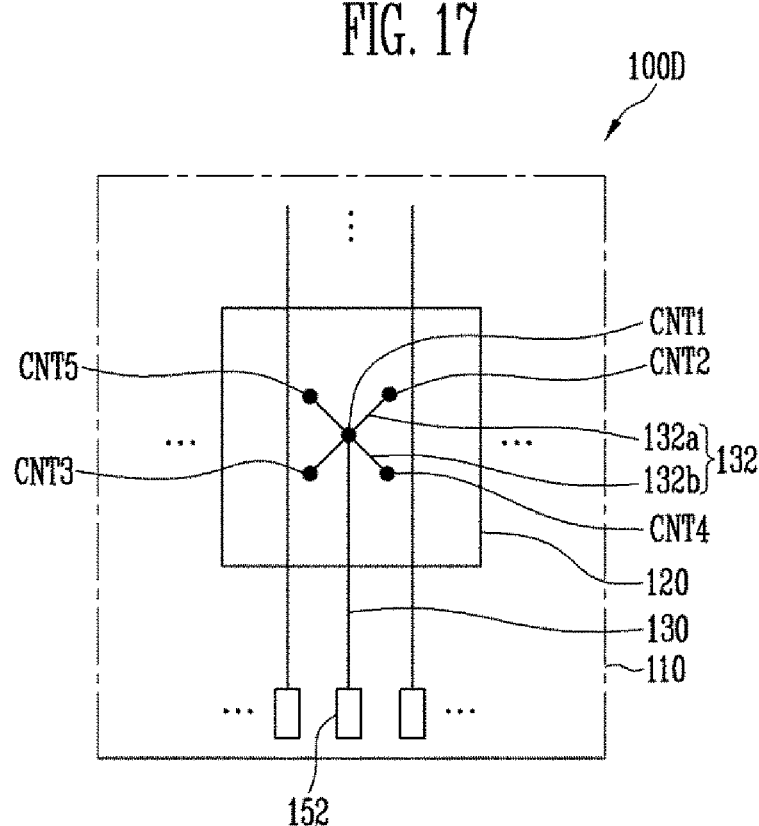
Figure 18:
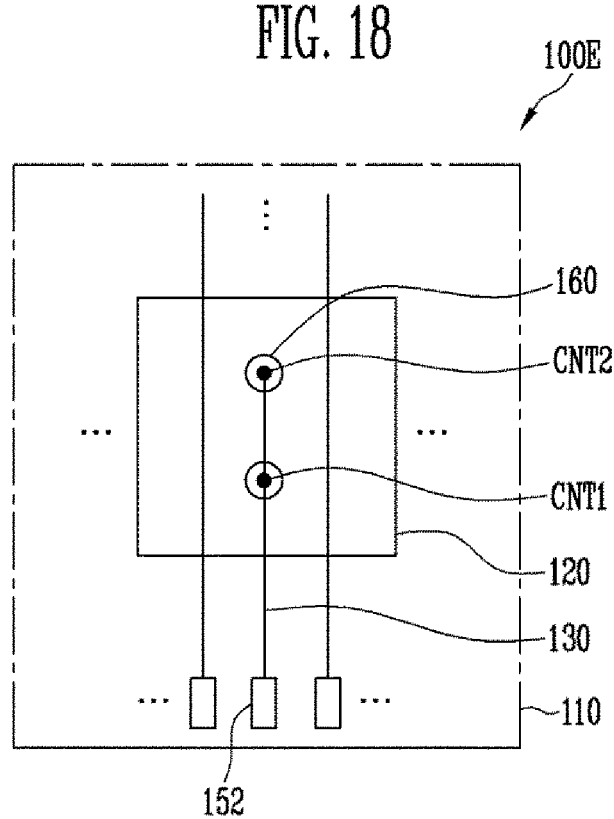
FIGS. 18, 19, 20, and 21 illustrate a touch sensor according to an exemplary embodiment.
Figure 19:
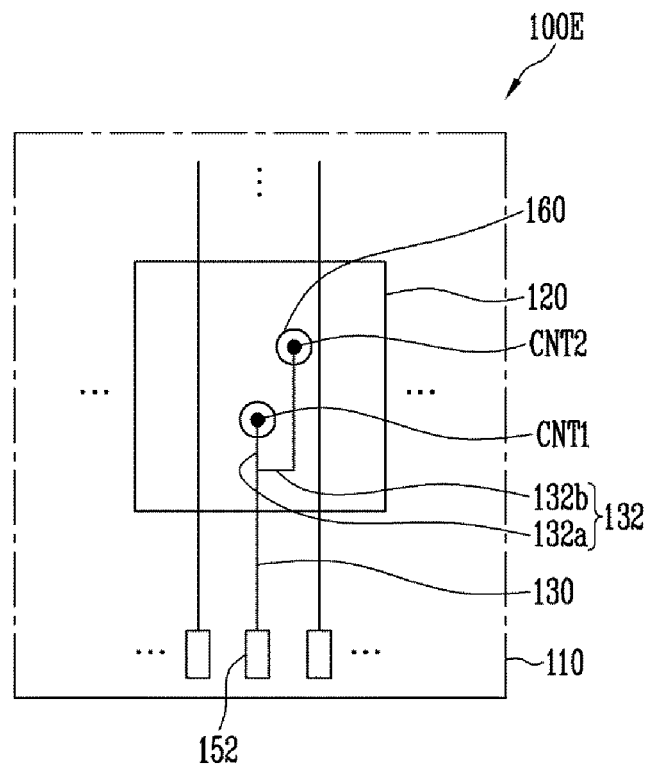
Figure 20:
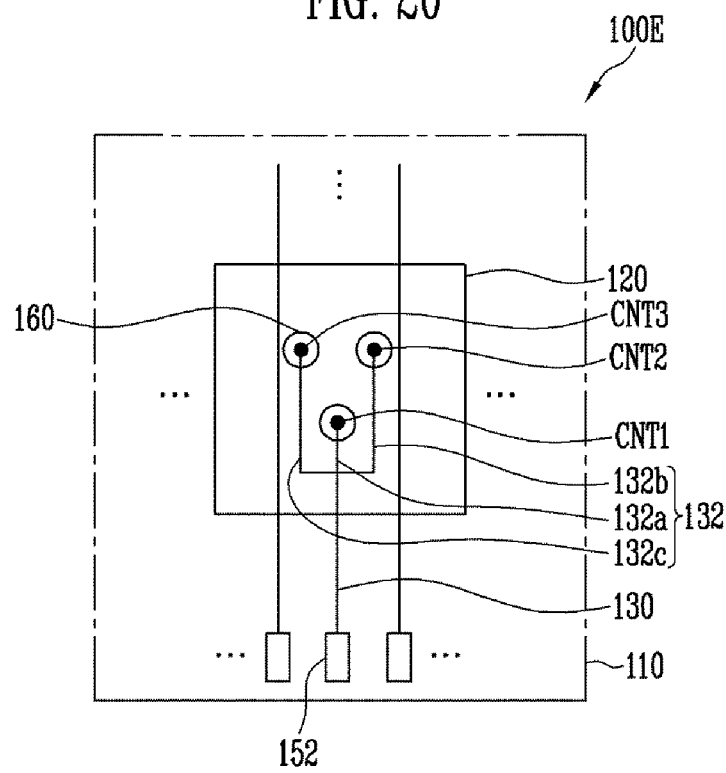
Figure 21:
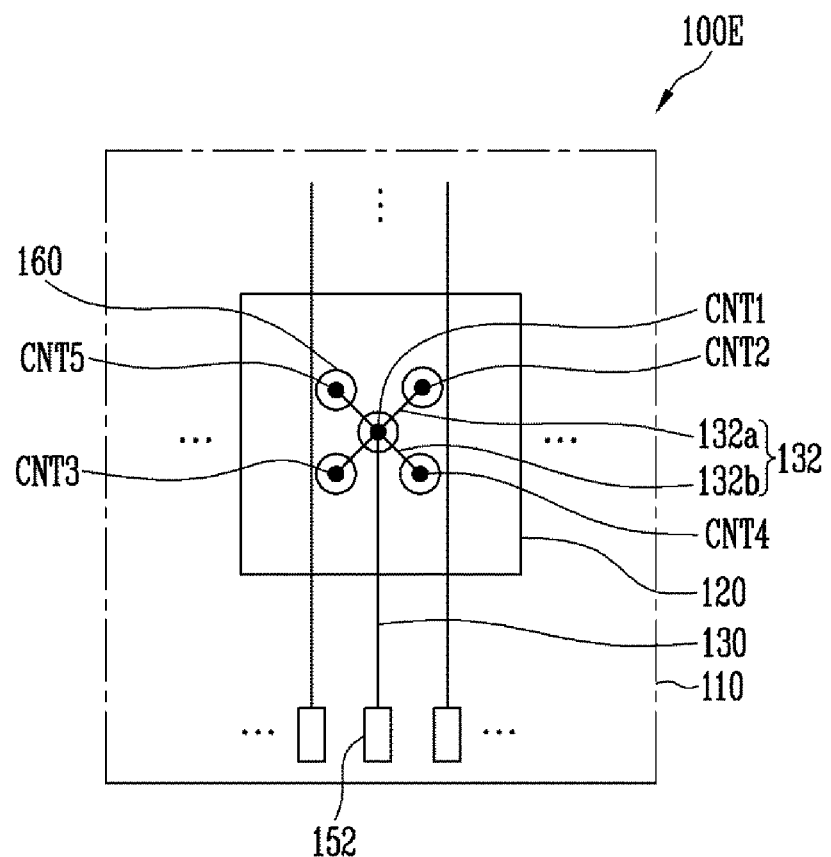

FIGS. 15, 16, and 17 illustrate a touch sensor according to an exemplary embodiment. In the description of the exemplary embodiments of FIGS. 15, 16, and 17, a detailed description of similar or identical components and/or configurations to those the above-described embodiments, for example, as the exemplary embodiment of FIG. 13, will be omitted.

Referring to FIG. 15, the first and second contact portions CNT1 and CNT2 corresponding to each sensor electrode 120 may be disposed at arbitrary positions in the region where the corresponding sensor electrode 120 is disposed. The first and second contact portions CNT1 and CNT2 may be physically and/or electrically connected to each other through a branch wire 132 including at least two sub-wiring portions; a first sub-wiring portion 132a and a second sub-wiring portion 132b.

In detail, a sensor unit 100D according to the present embodiment may further include a branch wire 132 overlapping each sensor electrode 120. That is, the sensor unit 100D may include a plurality of branch wires 132 overlapping the plurality of sensor electrodes 120, respectively.

The first and second sub-wiring portion 132a and 132b connect the plurality of contact portions, for example, the first and second contact portions CNT1 and CNT2, respectively, corresponding to the respective sensor electrode 120 to each other. Accordingly, restrictions on the positioning of the first and second contact portions CNT1 and CNT2 may be relaxed and the limitation or restriction on design may also be relaxed, by additionally providing the first and second sub-wiring portion 132a and 132b. Further, in the above-described embodiment, the first and second contact portions CNT1 and CNT2 do not need to be disposed in a straight line with the corresponding sensor line 130, so that the plurality of contact portions including the first and second contact portions CNT1 and CNT2 may be dispersed at an arbitrary position. In this case, one region of each of the branch wire 132 may be obliquely inclined with respect to the first and second directions in which the sensor electrodes 120 are arranged, or may be bent or curved at least one point.

According to an exemplary embodiment, each of the branch wires 132 may have conductivity by including at least one of a metallic material, a transparent conductive material, and various other conductive materials. In addition, each of the branch wires 132 may be transparent or opaque.

According to an exemplary embodiment, the branch wires 132 may be formed together with the sensor lines 130 in the process forming the sensor lines 130. For example, the branch wires 132 may be integrally connected to the respective sensor lines 130. However, the present invention is not limited thereto. For example, according to an exemplary embodiment, the sensor lines 130 and the branch wires 132 may be separately formed, and a pair of the sensor line 130 and the branch wire 132 corresponding to each other may be electrically connected through at least one contact hole.

Referring to FIG. 16, each of the sensor electrodes 120 and a corresponding sensor line 130 may be electrically connected through three or more contact holes. For example, at least first, second, and third contact portions CNT1, CNT2, and CNT3 may be dispersed in the region where each sensor electrode 120 is disposed.

In addition, according to an exemplary embodiment, each of the branch wires 132 may include at least three sub-wiring portions. For example, each branch wire 132 may include first, second, and third sub-wiring portions 132a, 132b, and 132c connecting the corresponding sensor line 130 to the first, second, and third contact portions CNT1, CNT2, and CNT3, respectively. That is, according to an exemplary embodiment, each of the first, second, and third sub-wiring portions 132a, 132b, and 132c may connect one of the first, second, and third contact portions CNT1, CNT2, and CNT3 to the corresponding sensor line 130.

Referring to FIG. 17, each of the branch wires 132 may include at least two sub-wiring portions 132a and 132b, and each sub-wiring portion may connect at least two contact portions to each other. For example, in the region where each sensor electrode 120 is disposed, the first contact portion CNT1 connected to the corresponding sensor line 130, and second to fifth contact portions CNT2 to CNT5 radially disposed around the first contact portion CNT1 may be provided. In addition, according to an exemplary embodiment, each branch wire 132 may include a first sub-wiring portion 132a connecting the first contact portion CNT1 to a the second and third contact portions CNT2 and CNT3, and a second sub-wiring portion 132b connecting the first contact portion CNT1 to the fourth and fifth contact portions CNT4 and CNT5.

As in the above-described embodiments, the shape, structure, and/or position of the plurality of contact portions including the first and second contact portions CNT1 and CNT2 and the branch wires 132 may be variously changed depending on embodiments.

FIGS. 18, 19, 20, and 21 illustrate a touch sensor according to an exemplary embodiment. In the description of the exemplary embodiments of FIGS. 18, 19, 20, and 21, a detailed description of similar or identical components and/or configurations to those of the above-described embodiments, for example, to the exemplary embodiments of FIGS. 6 to 17 will be omitted.

Referring to FIGS. 18, 19, 20, and 21, the multi-contact structure described in the exemplary embodiments of FIGS. 13, 14, 15, 16, and 17 and the contact reinforcing structure described in the exemplary embodiments of FIGS. 6 to 12 may be applied together in a sensor unit 100E according to the present embodiment. For example, a plurality of contact portions including the first and second contact portions CNT1 and CNT2 may be disposed in the region where each sensor electrode 120 is disposed. Also, according to an exemplary embodiment, the plurality of contact portions may be connected through the respective branch wires 132. In addition, the conductive patterns 160 individually disposed on the respective contact portions may be further provided in the region where each sensor electrode 120 is disposed.

In the exemplary embodiments of FIGS. 18, 19, 20, and 21, the branch wires 132 may be integrally connected to the conductive patterns 160 disposed on the respective sensor electrodes 120. The branch wires 132 may be integrally connected to the respective sensor lines 130.

According to the above-described embodiment, the contact resistance between each of the sensor electrodes 120 and the respective sensor lines 130 may be effectively reduced and the sensor electrodes 120 and the respective sensor lines 130 may be stably connected.

FIG. 22 illustrates a touch sensor according to an exemplary embodiment. For example, FIG. 22 illustrates an exemplary embodiment of the arrangement structure of the sensor electrodes 120. In the description of the exemplary embodiment of FIG. 22, a detailed description of similar or identical components and/or configurations to those of the above-described embodiments will be omitted.

Referring to FIG. 22, a sensor unit 100F according to the present embodiment may be a mutual capacitive sensor unit. The sensor unit 100F may include the first electrodes 122 and the second electrodes 124 distributed in the sensing area SA so as not to overlap with each other.

In detail, the sensor electrodes 120 may include the plurality of first electrodes 122 and the plurality of second electrodes 124. The plurality of first electrodes 122 may be arranged along a first direction (e.g., the X direction) and each of the first electrodes 122 may extend in a second direction (e.g., the Y direction) that intersects with the first direction. The plurality of second electrodes 124 may be arranged between the first electrodes 122 and spaced apart from the first electrodes 122. In addition, the plurality of second electrodes 124 may be arranged along the first and second directions. To this end, the second electrodes 124 may be divided into smaller sizes than the first electrodes 122. For example, each of the second electrodes 124 may have a smaller size than each first electrode 122.

A group of electrodes among the first electrodes 122 and the second electrodes 124 (e.g., the electrodes of any one of the first electrodes 122 and the second electrodes 124) may be driving electrodes and electrodes in the other group may be sensing electrodes. For example, if the first electrodes 122 are driving electrodes, the second electrodes 124 are sensing electrodes. If the first electrodes 122 are sensing electrodes, the second electrodes 124 are driving electrodes.

According to an exemplary embodiment, respective X coordinates of touch input may be defined by the first electrodes 122 and respective Y coordinates of touch input may be defined by the second electrodes 124. Also, according to an exemplary embodiment, the second electrodes 124 may be connected to different sensing channels (or driving channels), or the second electrodes 124 arranged on the same horizontal line may be connected to the same sensing channel (or the same drive channel).

The contact structure according to at least one of the above-described embodiments may be applied to the touch sensor according to the present embodiment. For example, the sensor unit 100F according to the present embodiment may include the multi-contact structure using the plurality of contact holes CNT and branch wires 132, and the contact reinforcing structure using the conductive patterns 160 covering the top of respective contact holes CNT. That is, the above-described embodiments of the present invention described above may be widely applied to touch sensors having various structures and/or driving methods.

Various embodiments provide a touch sensor and a display device including the touch sensor. According to the touch sensor and the display device, it is possible to improve or ensure uniformity of sensitivity and visibility throughout the sensing area of the touch sensor. In addition, it is possible to detect even a fine and/or weak touch input as the interval or distance between the sensor electrodes is reduced. Furthermore, it is possible to reduce the influence of noise as a width of each sensor line is extended. Accordingly, it is possible to provide a high-sensitive touch sensor and a display device including the same.

Some of the advantages that may be achieved by exemplary embodiments of the invention and include reducing non-uniform visibility characteristics of the sensing area, and reducing influence of noise in the sensing lines and increasing the touch sensitivity by reducing the dead zone and increasing line space of the sensor lines. Furthermore contact resistance between the sensor electrodes and the sensor lines may be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A touch sensor, comprising:
a first substrate;
sensor electrodes spaced apart from each other on a first layer on one surface of the first substrate;
sensor lines disposed on a second layer different from the first layer;

contact portions electrically connecting a sensor electrode of the sensor electrodes to a sensor line of the sensor lines; and branch wires overlapping the sensor electrode and connecting the contact portions corresponding to the sensor electrode to each other.

2. The touch sensor of claim 1, further comprising:

conductive patterns individually disposed on the contact portions, respectively, and electrically connected to the sensor electrode.

3. The touch sensor of claim 2, wherein the branch wires are integrally connected to the conductive patterns on the sensor electrode.

4. The touch sensor of claim 2, wherein each of the conductive patterns completely covers an upper surface of each of the contact portions and has a greater area than each of the contact portions.

5. The touch sensor of claim 2, wherein the sensor electrodes are extended or arranged along a first direction and a second direction.

6. The touch sensor of claim 5, wherein the conductive patterns are arranged along the first direction or the second direction.

7. The touch sensor of claim 5, wherein the conductive patterns are arranged in an oblique direction inclined with respect to the first direction and the second direction.

8. The touch sensor of claim 5, wherein the conductive patterns have a first width and a second width in the first direction and the second direction, respectively; and wherein the first width is equal to the second width.

9. The touch sensor of claim 1, wherein the branch wires are integrally connected to the sensor line, respectively.

10. The touch sensor of claim 1, wherein a region of each of the branch wires is inclined with respect to an oblique direction in which the sensor electrodes are arranged, or is bent or curved at least at one point.

11. The touch sensor of claim 1, wherein:

each of the branch wires includes a plurality of sub-wiring portions, and each of the sub-wiring portions connects at least two of the plurality of contact portions with each other or connects one of the plurality of contact portions to a corresponding sensor line.

12. The touch sensor of claim 1, further comprising at least one of:

a first insulating layer interposed between the first substrate and the sensor electrodes; and a second insulating layer interposed between the sensor electrodes and the sensor lines.

13. The touch sensor of claim 12, wherein the sensor lines are disposed between the first insulating layer and the second insulating layer, and wherein the sensor electrodes are on top of the second insulating layer.

14. The touch sensor of claim 12, wherein the sensor electrodes are disposed between the first insulating layer and the second insulating layer, and wherein the sensor lines are on top of the second insulating layer.

15. The touch sensor of claim 12, further comprising:

a third insulating layer on the sensor electrodes and the sensor lines.

16. The touch sensor of claim 1, further comprising:

a second substrate disposed on another surface of the first substrate; and a coupling member disposed between the first substrate and the second substrate.

17. The touch sensor of claim 1, wherein the sensor electrodes are arranged in a matrix form along first and second directions.

18. The touch sensor of claim 1, wherein the sensor electrodes comprise:

first electrodes arranged along a first direction and each extending along a second direction crossing the first direction; and second electrodes disposed between the first electrodes so as to be spaced apart from the first electrodes, the second electrodes divided into a smaller size than the first electrodes and arranged in plurality along the first and second directions, respectively.

19. A display device, comprising:

pixels disposed in a display area;

sensor electrodes spaced apart from each other on a first layer in a sensing area overlapping the display area;

sensor lines disposed on a second layer different from the first layer;

contact portions electrically connecting a sensor electrode of the sensor electrodes to a sensor line of the sensor lines; and branch wires overlapping the sensor electrode and electrically connecting the contact portions corresponding to the sensor electrode to each other.

20. The display device of claim 19, further comprising:

conductive patterns individually disposed on the contact portions, respectively, wherein the conductive patterns are arranged in an oblique direction inclined with respect to a width direction and a longitudinal direction of the pixels.

* * * * *